United States Patent [19]
Kristen et al.

[11] 3,809,935
[45] May 7, 1974

[54] ELECTRIC MOTOR CONSTRUCTION

[75] Inventors: Reiner Kristen; Manfred Liska, both of Nurnberg, Germany

[73] Assignee: Siemens Aktiengesellschaft, Munchen, Germany

[22] Filed: Sept. 15, 1972

[21] Appl. No.: 289,550

[30] Foreign Application Priority Data
Sept. 20, 1971 Germany............................ 2146893

[52] U.S. Cl. ................................................ 310/68
[51] Int. Cl. ............................................ H02k 11/00
[58] Field of Search..... 310/68, 68 D, DIG. 3, 68 B, 310/156, 177, 219; 318/138, 254

[56] References Cited
UNITED STATES PATENTS

| | | | |
|---|---|---|---|
| 3,604,960 | 9/1971 | Krestel............................. | 318/254 |
| 3,644,765 | 2/1972 | Janson................................ | 310/68 |
| 3,198,972 | 8/1965 | Larson................................ | 310/68 |
| 3,253,167 | 5/1966 | Bates................................. | 310/68 |
| 3,531,671 | 9/1970 | Hohne................................ | 310/68 |
| 3,386,019 | 5/1968 | Hill................................... | 318/254 |
| 3,531,702 | 9/1970 | Hill................................... | 318/254 |
| 3,412,303 | 11/1968 | Rakes................................ | 318/254 |
| 3,486,099 | 12/1969 | Brunner............................. | 318/254 |

*Primary Examiner*—R. Skudy
*Attorney, Agent, or Firm*—Kenyon & Kenyon Reilly Carr & Chapin

[57] ABSTRACT

A DC motor of the type commutated by Hall generators and solid-state switching elements is made with a construction at its end through which the motor's field winding conductors extend, comprising a stack of parts connected together to that end of the motor and including a mounting for the Hall generators, a heat sink mounting the switching elements, and a circuit board for the various circuitry components.

5 Claims, 2 Drawing Figures

ELECTRIC MOTOR CONSTRUCTION

BACKGROUND OF THE INVENTION

Electric DC motors exist having permanent magnet rotors working within field windings controlled by solid-state switching elements actuated by Hall generators located to be influenced by the rotor's magnetic flux. With this type of motor the conductors which power the field windings extend from one end of the motor as do the conductors which carry the signals from the Hall generators. These must be connected with the solid-state switching elements and other circuitry components.

DESCRIPTION OF THE PRIOR ART

Heretofore, a motor of the above type has mounted the Hall generators on arms extending axially from a carrier plate made of insulating material mounted on the end of the motor from which the field winding conductors extend, the other end of the motor being the driving end from which the motor shaft protrudes for connection with the device to be powered.

After the motor is mechanically connected to the device, the field conductors and the Hall generator conductors are manually connected to the solid-state switching elements and other circuitry components which are separate from the motor, this usually requiring the use of conductors of such length as to involve the risks of heating and voltage drop, that control errors can occur due to stray voltage pick-ups resulting from the conductor's lengths, and the danger of connection mistakes which may lead to destruction of the sensitive Hall generators. To make the rotor run in the desired rotative direction, the Hall generator conductors must be appropriately connected, and to effect reverse motor operation, their connections must be reversed.

SUMMARY OF THE INVENTION

One object of the present invention is to provide a motor of the described type with a construction that is self-contained in that the Hall generators, the solid-state switching elements and the necessary circuitry components are integrated with the motor as a unit requiring no wiring at the site where the motor is installed, whereby to overcome the disadvantages outlined above.

This object is attained by a construction at the motor's end from which the field winding conductors extend, comprising a stack of parts which are connected together to that end as an integrated part of the motor.

In this stack, starting at the motor's end, there is an annular carrier made of electrically insulating material and having four symmetrically arranged arms projecting axially towards the motor and serving to locate the carrier symmetrically with respect to the rotor's axis by engaging an appropriate part of the motor's housing, and spaced closer to the carrier's axis, two forwardly projecting arms which carry the Hall generators operationally positioned and oriented at 90° electrically relative to the motor's rotor. Next, there is an annular metal heat sink mounting the solid-state switching components, the annular carrier having axially extending arms projecting away from the motor and positioning this heat sink. Then on the outside there is a circular board for carrying the various circuitry components required for the operation of a motor of this type. With all of these parts physically close together and connected together to the end of the motor, as by screw fastenings, a unitary construction results.

All of the conductor connections may be made by the manufacturer of the motor. By making the stack so it can be rotated, motor rotation in either direction is obtained without rewiring.

BRIEF DESCRIPTION OF THE DRAWINGS

The accompanying drawings are largely schematic in nature and are simplified to show more clearly the fundamentals of the preferred embodiments of the present invention. In these drawings the various figures are as follows.

DESCRIPTION OF THE PREFERRED EMBODIMENTS

Figure 1:
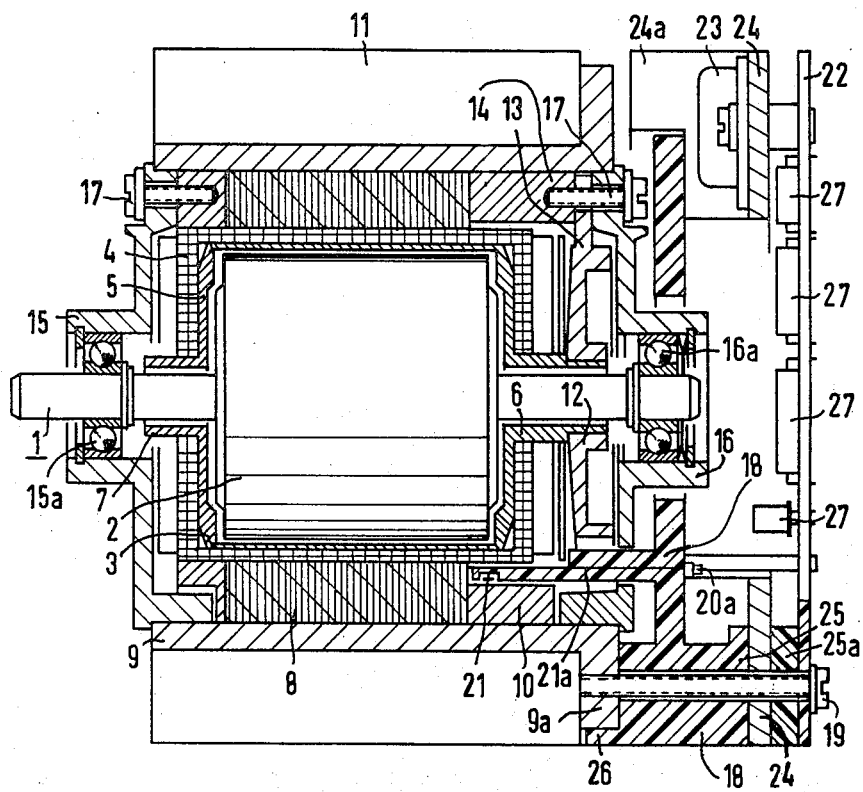
FIG. 1 is a longitudinal section of the new motor construction.

Referring first to FIG. 1 of the above drawings, a rotor shaft 1 mounts a permanent magnet rotor 2 having two poles. This rotor 2 is surrounded by a field winding body 3 which carries a four-part field winding 4, the winding support body 3 having a separate cover 5 permitting installation of the rotor. This cover 5 and the opposite end cover have tubular extensions 6 and 7 which are concentric with the motor shaft 1 and through which the latter extends.

The field winding 4 is surrounded by a magnetic return yoke 8 made from annular stamped metal laminations held radially by a cylindrical motor housing 9. A ferro-magnetic ring 10 is butted against the right-hand end of the return yoke 8 to serve as the magnetic return for two Hall generators described hereinafter. The parts 8, 9 and 10 are non-rotative relative to each other. The housing 9 has cooling fins 11 to assist in dissipating heat when the motor is operated.

A flange 12 mounts the tubular extension 6 of the field winding body 3, this flange resisting torque by having mounting arms 13 which engage pads 14 on the ferro-magnetic return ring 10. Cover plates 15 and 16 are connected to the ends of the motor by screws 17. These cover plates mount bearings 15a and 16a for the rotor shaft 1. Although not shown, the conductors for the field windings 4 extend as usual towards the right-hand end of the motor.

In accordance with the present invention, an annular carrier 18 made of electrical insulating material and through which screws 19 pass, has two arms 20 extending axially towards the motor's rotor and circumferentially interspaced by 90 electrical degrees relative to the rotor. These arms mount the Hall generators 21 in recesses 21a formed on the insides of the arms, the latter having arcuate shapes which are concentric with the axis of the rotor shaft 1. These arms position the Hall generators within the ferro-magnetic ring 10 at a radial distance from the permanent magnet rotor 2 so as to be controlled by the magnetic field of the latter. The conductors 21a extending from the Hall generators are connected with terminal lugs 20a, it being possible to mold these conductors and the terminal lugs into the carrier 18 and its arms 20.

As previously indicated, all of the conductors extend from the same side of the motor and should desirably be connected as directly as possible with their associated electrical parts. To mount the circuitry components, a circular circuit board 22 made of insulating material may be used.

Figure 2:
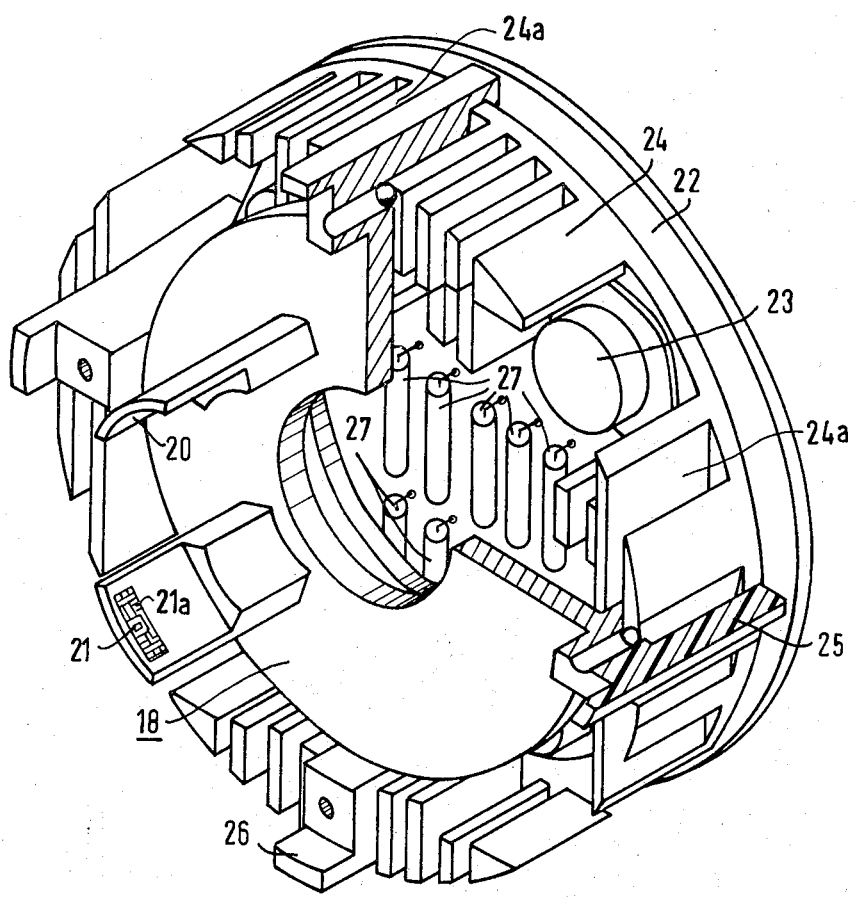
FIG. 2 is a partly sectioned perspective view of the stack of parts referred to hereinbefore.

However, the switching elements 23 produce heat and therefore are mounted on an annular flat heat sink 24 which is made of metal so as to be a good heat conductor and having fins 24a. Arms 25 extend, away from the motor, axially from the carrier 18 and project between the fins 24a of the heat sink 24, and form abutments for the flat portion of the annular heat sink 24, the latter having a plate-like body from which the fins extend towards the motor housing. These arms 25 must be at least long enough to space the elements 23 from the opposing face of the carrier 18. In FIG. 1 the arms 25 are shown as being in flat abutting relationship with the heat sink 24, while other possible modifications are suggested by FIG. 2. For example, the uppermost one of the arms is there shown as being molded around the heat sink to integrate the two parts. In any event, the arms 25 must space the carrier 18 and the heat sink 24 far enough apart to provide clearance for the solid-state switching elements 28.

The arms 25 also extend towards the motor and form centering ears 26 which engage a flange 9a formed by the motor housing 9. This flange 9a is concentric with the rotor's axis and the arms 20 rotatively fit in an annular space between the ring 10 and the field winding 4. Therefore, by removing the screws 19 more or less, the stacked parts comprising the carrier, the heat sink and the circuitry board, with all conductors necessary to interconnect the elements and components they carry, can be rotated as required to reorient the Hall generators for opposite rotation of the rotor.

The circuitry board is shown as carrying circuitry components 27 which are intended only to illustrate the purpose of this board.

In FIG. 1 this board 22 is spaced by electrical insulating material spacers 25a, the screws 19 passing through the board 22, these spacers 25a, the arms 25 of the carrier 18 and being screwed into the flange 9a of the housing 9, to form the stack of closely spaced supports for the desired self-contained characteristic. Obviously, although not shown, the conductor wiring is of short length and can be made up by the motor manufacturer.

The arms 25 of the carrier 18 form projections extending towards and away from the end 9a–16 of the motor housing 9 in which the rotor shaft is journaled. The portions or projections extending toward the housing position the carrier relative thereto with its Hall generator carrying arms extending from locations closer to the motor's axis, as required to properly position these generators. The portions or projections extending away from the motor housing support the heat sink 24 with its elements which create heat spaced from the carrier made of insulating material. There are four of these arms 25 symmetrically arranged, thus permitting 90° rotation of the stack of parts and, therefore, of the Hall generators, the latter being, of course, signal generators for the solid-state elements. Such elements are of the transistor or semi-conductor type.

Note that these arms 25 extend between the fins 24a of the heat sink 24, the elements 23 being symmetrically spaced centrally between the arms and within each group of fins, whereby the arms are located on the sink 24 via its flat portion where the maximum cooling has been obtained, remembering that these arms may be integral parts of the carrier made of electrical insulating material.

The fins are shown oriented for vertical convection cooling, but this may be maintained by rotating the motor housing 90° when reverse operation is desired.

The circuit board 22 is also made of insulating material but it also is spaced from the heat sink by the washers 25a, or their equivalent, which are also located where the heat sink is coolest.

The screws 19 clamp the stack of the three parts 18, 24 and 22 together and to the motor housing, so that with the wiring installed, the motor, as shipped by its manufacturer, is a self-contained motor to be installed by the user in the same manner as the more conventional DC motor using a commutator of the segment and brush type. The stack of parts may be integrated independantly of the screws 19, which might be advisable if motor reversal is contemplated after the motor is installed.

What is claimed is:

1. A DC electric motor including a housing having end plates and containing a rotor and a field winding having connecting conductors extending therefrom at one axial end of the housing, and commutated by solid-state elements actuated by signal generators located for control by said rotor adjacent to said end and associated circuit components; wherein the improvement comprises said rotor being journalled by and between said end plates, a carrier located adjacent to said end outside the end plate at said end and having axially inwardly extending projections on which said generators are carried, followed outwardly from said end by a heat sink mounting said elements and a circuit board on which said components are mounted, and means for connecting said carrier, a heat sink and board together and to said end respectively in interspaced relationship.

2. The motor of claim 1 in which said carrier and board are made of electrically insulating material and said heat sink is made of metal, said means spacing the solid-state elements on said heat sink from said carrier.

3. The motor of claim 1 in which said end has a circular portion concentric with said rotor's axis and said carrier has arms extending to and engaging said portion and positioned to hold said carrier concentric with the axis of said rotor for a plurality of rotated positions, said projections extending from said carrier non-rotatively with respect thereto, said means including said arms.

4. The motor of claim 2 in which said means includes arms extending integrally from said carrier and engaging said heat sink, said elements being mounted on the latter in interspaced relation and said arms being interspaced between said elements, said heat sink having cooling means between said elements and said arms.

5. The motor of claim 4 in which said board is made of insulating material and said end has a circular portion concentric with said rotor's axis and said carrier has arms extending to and engaging said portion and positioned to hold said carrier concentric with the axis of said rotor for a plurality of rotated positions, said projections extending from said carrier non-rotatively with respect thereto, said means including said arms.

* * * * *